Jan. 22, 1952 S. C. TURKENKOPH ET AL 2,583,242
PRESSURE SEATED REVERSING VALVE
Filed Aug. 16, 1950 4 Sheets-Sheet 4

INVENTOR.
SYLVANUS C. TURKENKOPH
BY & THOMAS EVANS
Arthur R obert
ATTORNEY

UNITED STATES PATENT OFFICE 2,583,242

PRESSURE SEATED REVERSING VALVE

Sylvanus C. Turkenkoph and Thomas Evans, Louisville, Ky., assignors, by mesne assignments, to Minneapolis Moline Company, Hopkins, Minn., a corporation of Minnesota Application August 16, 1950, Serial No. 179,712

18 Claims. (Cl. 121—46.5)

This invention relates to fluid control valves, and relates in particular to control valves for reversible fluid motors, such as, for example, servomotors. This application is a continuation in part of our application for Fluid Control Valve, Serial No. 72,864, filed January 26, 1949, and now abandoned.

In valves of this type various constructions heretofore have been employed to utilize the pressure of the supply fluid for maintaining the working faces of the valve in sealing relation. Such arrangements maintain the valve working faces in sealing relation during the period when fluid is flowing through the valve, at which time a small leakage generally entails no serious disadvantage, but are not satisfactory when the valve is in closed position. Where the fluid under pressure for operating the motor is supplied by a pump, they require that the pump maintain sufficient pressure to hold the valve working surfaces sealed, or that a pressure reservoir be provided. The latter obviously is not possible without the provision of further complicated mechanisms where the pressure fluid is a liquid. Furthermore, the application of line presure against the working surfaces makes the valve hard to operate, and may necessitate the provision of further complicated mechanism to facilitate operation of the valve.

It is an object of the present invention to provide a control valve for a fluid motor or the like, wherein the working surfaces of the valve are maintained in sealing relation in the closed or neutral position of said valve by the differential or back pressure exerted across the working element of the motor.

Another object is the provision of a control valve for a reversible servo-motor or the like in which the back pressure of the motor fluid regardless of its direction exerts a seating pressure on the valve sealing surfaces to prevent leakage through the valve.

Still another object is the provision of a control valve for a reversible servo-motor or the like providing for flow through the valve of supply fluid, and exhaust fluid from either end of the motor, and wherein the fluid under the highest pressure exerts a seating pressure on the valve sealing surfaces to prevent leakage through the valve.

A further object of the invention is the provision of a control valve of this type wherein movement of the working element of the motor under a negative load is prevented from unseating the working surfaces of the valve.

A further object is the provision of a valve of this type wherein the total force exerted by the differential pressure serving to hold the valve working faces sealed is maintained at a small value to allow easy operation of the valve.

In accordance with the present invention in a control valve and motor system of the type having relatively movable valve members with cooperating sealing surfaces and ports in said surfaces arranged to provide for forward or reverse flow of fluid to the motor and bypassing of fluid around the motor in neutral position of the valve, there is provided a seating pressure chamber and a pair of pressure seating passages in one of said valve members having one-way valves therein allowing flow into said chamber, the pressure seating passages being in communication with the forward and reverse ports of the motor when the control valve is in fluid bypassing position to transmit the higher of the forward or reverse pressures across said valve member to said chamber to hold said members in sealing engagement. By this arrangement the motor back pressure holds the valve members in sealing engagement and prevents leakage of fluid from the motor and consequent creeping of the motor. This invention also eliminates the need for operating the pump against a high back pressure when not connected to supply fluid to the motor. If desired, a third pressure seating passage having a one-way valve therein may be provided, the third pressure seating passage being in communication with the supply port when the valve is in fluid bypassing position to hold the valve member seated in this position. In this arrangement, the highest pressure, whether it be the supply pressure or the back pressure from either end of the motor, applies a pressure to hold the valve sealing surfaces in engagement. Or any other desired means or arrangement may be provided for holding the valve members seated while supplying fluid under pressure to the motor.

Where the control valve is employed for operating a fluid motor subject to an oscillating or negative load, that is, to a load operating in the same direction or augmenting the fluid pressure, provision may be made to throttle the exhaust flow from the motor to prevent the development on the intake side of the motor of a pressure so low that it will develop an unseating force on the valve. This may be accomplished by the provision in one or both of the supply lines of the motor of a one-way valve opening in the direction of supply flow to the motor and a throttled bypass passage around the one-way valve. This serves to throttle the exhaust flow from the motor. This combined one-way valve and bypass is located downstream of the valve surfaces, that is, between the valve surfaces and the motor. Or, the unseating action may be avoided by locating pressure seating passages in a non-rotating part of the valve and providing check valves therein opening into the common pressure chamber which exerts a seating pressure on the valve. Or, in still another arrangement a single flow throttling restriction is provided for carrying the exhaust from the motor, and supply passages in the valve are arranged to bypass the restriction when supplying fluid to the motor while the exhaust from the motor passes through the restriction. This eliminates the need for a check valve. The valve is made easier to operate by reducing contacting surfaces substantially to a minimum, and equalizing fluid pressures on the exposed valve surfaces. For this purpose pressure equalizing passages are connected to the seating pressure chamber so that the equalizing forces will act under the highest prevailing pressure. The invention is applicable to various types of valves involving sealing surfaces which slide in contact with each other.

The invention will be described in greater detail in connection with the accompanying drawings wherein are shown preferred embodiments of the invention by way of example, and wherein.

Referring to the drawing, the control valve comprises an enclosing cylinder or jacket 1 received between the flanged heads 2 and 3 and held in assembled relation by stay bolts 4 passing through the flanges of the heads, or in any other suitable manner. Suitable gaskets or sealing rings 5 are provided to prevent leakage at the joints of the jacket and heads. A movable valve member consists of a cylindrical stem 8, an enlarged or barrel portion 9, and a stub portion 10. Stem 8 passes through a bore 12 in the head 2 and has a packing ring in a circumferential groove to provide a sealed connection therewith. The stem has a squared portion 13 on its end adapted to receive a wrench or handle (not shown) for turning the valve member and the wrench may be held in place by a nut (not shown) threaded on the cylindrical threaded end 14. A suitable stop member 15 may be provided to limit the extremes of angular movement of the valve member to about 90°. The stub portion 10 is received in a guide bore 16 in the head 3 and may be provided with a sealing ring.

Figure 1:
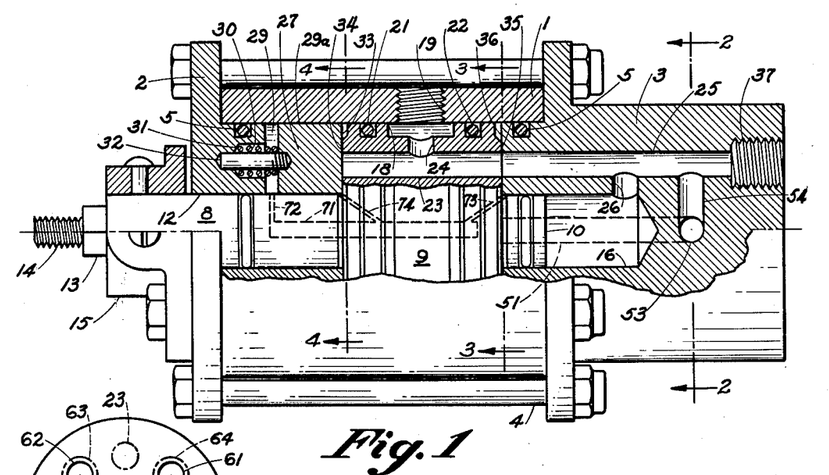
Figure 1 is a side view showing the valve housing in quarter section and with parts of the valve housing and valve barrel broken away.

The enlarged valve barrel portion 9 has a middle circumferential groove 18 which is located to register with the threaded fluid pressure inlet or opening 19 in the jacket, and sealing rings 21, 22 may be provided in suitable grooves on either side of the middle groove 18 to cooperate with jacket 1 and prevent leakage of fluid from groove 18 along the barrel toward the ends. The barrel has a supply bore or distribution passage 23 extending axially and eccentrically thereof, and a radial bore or duct 24 connects annular groove 18 therewith. In neutral position of the valve the axial supply bore 23 registers with an axial eccentrically located bypass bore or passageway 25 in the head 3, as shown in Figure 1, which in turn is connected by a pressure equalizing bore 26 with the guide bore 16.

A backing plate 27 is received in the annular space 29a bounded by the valve stem 8, valve barrel 9, jacket 1 and head 2. The backing plate is of less length than annular space 29a and is held spaced sufficiently from head 2 by springs 30 to provide a fluid pressure chamber 29 therebetween. Springs 30 are received in recesses 31 in the head 2 and are guided by posts 32 secured in a face of the backing plate. The ground face 33 of the backing plate is held against the ground face 34 of the valve barrel and the ground face 35 of the valve barrel is in turn held against ground face 36 of the head 3 by the pressure of the annular series of helical springs 30. In the position of the parts shown in Figure 1, fluid under pressure which enters inlet 19 in the jacket flows from annular groove 18 and duct 24 to supply bore 23 and bypass 25 back to the pump through a suitable external tube or conduit (not shown) connected at threaded socket 37 in the head 3 so that in this position the fluid is merely circulated without operating the servo-motor.

Figures 2, 3, 4, 5:
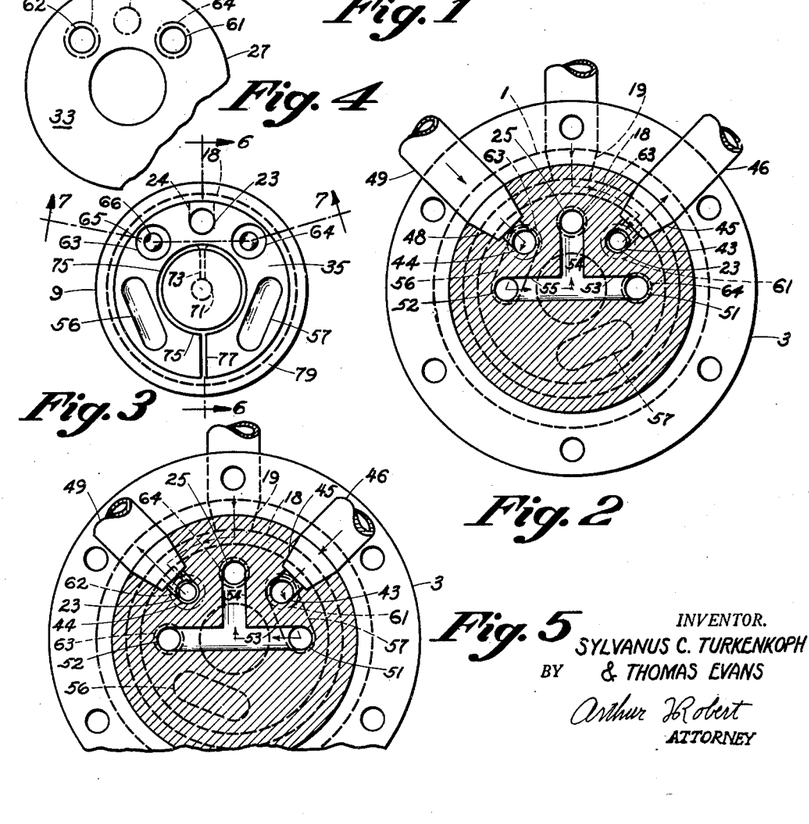
Figure 2 is a partly diagrammatic cross-section view taken on the line 2—2 of Figure 1.
Figure 3 is an end elevation of the valve barrel looking in the direction of the arrows 3—3 in Figure 1.
Figure 4 is an end elevation of a portion looking in the direction of the arrows 4—4 in Figure 1.
Figure 5 is a view similar to Figure 2, showing the valve member displaced ninety degrees.
Figure 6:
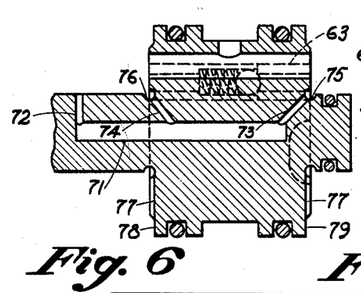
Figure 6 is a section taken on line 6—6 of Figure 3.
Figure 7:
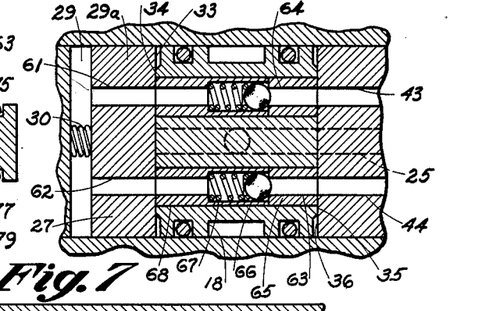
Figure 7 is a section taken on line 7—7 of Figure 3 with parts broken away.

The supply bore 23 in valve barrel 9 in cooperation with suitable passages in head 3 provides for directing fluid under pressure to either end of the hydraulic cylinder or servo-motor, depending on which direction the valve barrel is rotated. For this purpose, the internal face 36 of the head 3 has symmetrically located openings or passageways 43 and 44 (Figures 2 and 7) on opposite sides of passageway 25. Passageway 43 connects with a tapped socket 45 (Figures 2 and 5) in the surface of head 3 adapted to receive a conduit 46 connected to one end of the servo-motor 47 (Figures 8 and 9), while the tapped socket 48 in head 3 at the end of passageway 44 receives a conduit 49 connected to the other end of the servo-motor cylinder. Thus, by rotating the valve barrel about 45° clockwise from the neutral position as viewed in Figure 3 to the position shown in dotted lines in Figure 2, the distribution passageway 23 is brought into registration with passageway 43 to supply fluid under pressure to one end of the servo-motor cylinder by way of passage 43 and conduit 46. By rotating the valve barrel about 45° counter-clockwise from neutral position to the position shown in dotted lines in Figure 5, the distribution passageway 23 is brought in alignment with passageway 44 to supply fluid under pressure to the other end of the servo-motor cylinder by way of passage 44 and conduit 49. For clarity, the passageway 23 is shown in Figures 2 and 5 as a reduced diameter bore.

Provision is also made in the valve so that when fluid under pressure is supplied to one end of the servo-motor cylinder, the fluid on the other side of the piston in the servo-motor cylinder may be exhausted through the valve and returned to the pump or reservoir. The head 3 has two longitudinal bores 51 and 52 interrupting the face 36 which are interconnected by internal crossed bores or passages 53, 54 and 55 to the passageway 25 leading back to the pump. The face 35 of the valve barrel has two elongated blind grooves or culs-de-sac 56, 57 so located that when the valve barrel is turned clockwise as seen in Figure 2 to align passageways 23 and 43 to supply fluid under pressure to one end of the cylinder, the cul-de-sac 56 moves around to connect passageways 44 and 52, and thus a path is provided to exhaust the fluid from the other end of the servo-motor cylinder as shown by the arrows. The exhaust thus flows through connection 49, passage 44, cul-de-sac 56, passageway 52 and crossed bores 55, 54 to the common return 25 and thence to the pump. Conversely, when the valve barrel is turned counter-clockwise to align passageways 23 and 44 as shown in Figure 5, the return fluid or exhaust from the servo-motor entering at 45 flows through passageway 43, cul-de-sac 57, passage 51 and crossed bores 53, 54 to common return 25.

The valve structure embodies provision for applying the back pressure of either end of the servo-motor cylinder to press ground or lapped face 35 of the valve against ground or lapped face 36 of the head to prevent loss of pressure from the operating side of the servo-motor cylinder, and thus prevent creeping of the servo-motor piston and of appliances attached thereto. Springs 30 provide an initial bias to hold the respective faces of barrel 9 in engagement with the face 33 (Figure 1) of backing plate 27 and face 36 of head 3. Back pressure passages 61 and 62 (Figures 4 and 7) extend through backing plate 27 from face to face, and in neutral position of the valve, passages 61 and 62 are in alignment with axially extending back pressure passages 64 and 63 respectively in the valve barrel. Each passage 63 and 64 has a one-way or check valve therein opening in the same direction, and as the two check valves are alike, the construction of only one check valve will be described in detail. Passage 63 (Figure 7) contains a sleeve 65, the end of which serves as a seat for the ball 66 held in engagement therewith by a spring 67 abutting an enclosing sleeve 68. As the backing plate 27 does not rotate, it may be regarded as part of the housing.

Assuming power has been supplied to the servo-motor through connection 44, when the valve barrel is returned to neutral position back pressure passage 63 is in alignment with supply passage 44 to the motor and passage 62 in plate 27. The trapped pressure in the servo-motor cylinder developed by the appliance connected to the piston is transmitted from passage 44 through the check valve in passage 63 and through passage 62 to chamber 29, and exerts a pressure in chamber 29 on the plate 27 and the valve barrel to keep the faces of valve barrel 9 in sealing engagement with the faces of backing ring 27 and valve head 3, thus preventing leakage between the lapped or ground mating faces thereof. The chamber on the opposite side of the servo-motor piston also is connected to pressure chamber 29 by passages 43, 64 and 61, so that if the appliance connected to the servo-motor piston exerts a force in the opposite direction, the fluid pressure from the other chamber of the motor is transmitted by passages 43, 64 and 61 to chamber 29 to hold the valve faces in engagement. The check valves 66 are arranged to allow flow into pressure chamber 29 and prevent flow out of this chamber, and thus prevent short-circuiting of the fluid between the passages 43, 44 leading to opposite sides of the motor piston. If desired, the check valves may be located in the passages 61, 62 in the backing plate.

The high pressures encountered under some conditions may make the control valve difficult to rotate, because of the frictional contact of the sealing or mating surfaces of the valve barrel. We prefer to reduce the contacting surfaces to a minimum by cutting back or relieving the surfaces 34 and 35 of the valve barrel adjacent the periphery of the barrel and adjacent the stem. Resistance to turning may be further reduced by more or less counterbalancing the pressure effect on the valve barrel. For this purpose the valve has an axial bore or passageway 71 connected to the pressure chamber 29 by a radial bore 72. Inclined or radial bores 73 and 74 connect the relieved portions, recesses or grooves 75, 76 in the valve face with the bore 71, and radial grooves or recesses 77 in each face of the valve barrel connect the relieved grooves or recesses 75, 76 with the circumferential relieved areas 78 and 79 respectively. As all the relieved areas are connected to a common source of pressure, namely the chamber 29, the fluid pressures on these areas are directionally balanced. Thus, the axial force exerted by pressure plate 27 on the valve barrel is the unit pressure in chamber 29 times the contact area of one valve barrel face, plus the spring pressure, because on all other areas of the valve the fluid pressure is counterbalanced.

It sometimes happens during operation of the servo-motor, as for example, when operating a plow lift on a tractor, that the weight of the plow and the burrowing of the plow into the earth as the tractor advances causes the servo-motor piston to displace more volume than the quantity of pressure fluid supplied thereto, and this develops a vacuum on the working side of the servo-motor. That is, the piston tends to move faster than the fluid can fill the chamber. Under such conditions with the construction illustrated, as for example, with the distribution passage 23 in alignment with both supply passages 44 to the servo-motor and the pressure passage 62 to chamber 29 as shown in Figure 5, the vacuum developed in chamber 29 by a negative force on the motor may be sufficient to relieve the seating pressure on the valve seating surfaces to cause the exhaust pressure applied in cul-de-sac 57 to unseat the valve sealing surfaces and cause bypassing of fluid from passage 43 to passage 44, which causes the servo-motor to advance with a sudden jerk or jolt. This may be avoided by providing a combined one-way valve and bypass in one exhaust line upstream of the valve seating faces 35, 36 for example, in the connection between socket 45 and the servo-motor.

Figure 8:
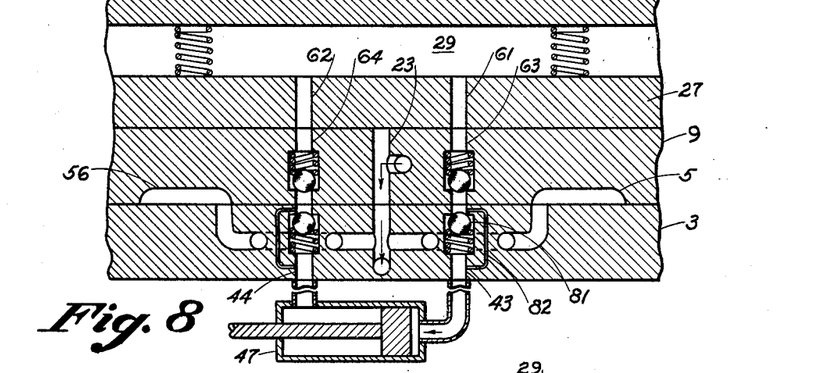
Figures 8 and 9 are diagrammatic views explaining the operation of the invention.
Figure 9:
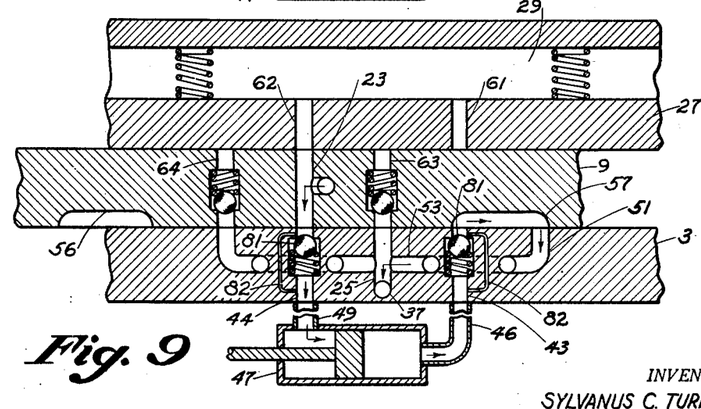

Figures 8 and 9 diagrammatically illustrate this arrangement applied to a slide valve in which the one-way valve 81 in the position shown in Figure 9, compels exhaust fluid from the servo-motor cylinder to flow through the bypass 82 which restricts exhaust flow from that side of the motor to a rate such that the plow cannot force the piston against the resistance of the bypass fast enough to create a vacuum on the working side. The danger of unseating the valve barrel thus is eliminated.

The operation of the invention will be further described in connection with the diagrams in Figures 8 and 9 illustrating a rectilinear operating or slide valve embodying the invention, and wherein like parts are indicated by like reference numerals. When the valve is moved to operating position at the left as shown in Figure 9, the distribution duct or port 23 is connected to the motor chamber passage 44 and the conduit 49, and the exhaust flows through conduit 46 and through bypass 82, passage 43, cul-de-sac 57, passage 51 and bore 53 to the common return 25. The check valve 81 prevents direct flow through passage 43, and the bypass 82 provides a sufficient restriction so that the pull of the plow, or other device connected thereto, to the right on the piston of the servo-motor, must force fluid through the bypass. This retards the movement of the piston sufficiently to prevent the development of a vacuum in chamber 29 which is connected through passages 62, 23 to the supply side of the motor chamber, and prevents unseating of the valve. We have shown check valves and bypasses 81, 82 in both exhaust lines of the motor, but it will be understood that they may be omitted from either or both lines where the vacuum-producing condition is not encountered.

When the servo-motor has reached the desired position the valve barrel 9 is returned to the neutral position shown in Figure 8. In this position the respective chambers at the ends of the servo-motor piston are connected through passages 43, 63, 61 and 44, 64, 62 respectively with the chamber 29. Thus, the pressure at either end of the servo-motor piston (whichever end is higher) is transmitted to chamber 29 to exert a seating pressure on the valve faces, and thus prevent separation of the valve seating faces and consequent leakage of fluid from the servo-motor chambers. As the seating faces are accurately ground or lapped, no leakage can occur from the motor chambers as long as the seating surfaces are in contact, and thus creeping of the motor piston is avoided.

The back pressure ports or passages connecting with the seating pressure chamber may be located in the housing and cooperate with suitable passages in the valve barrel. Although the valve construction illustrated in Figures 1 to 9 provides for maintaining the seating surfaces in contact during the operating position, that is, while fluid is flowing to the servo-motor, seating contact in such position or in the non-operating or neutral position can be maintained by any other mechanical or hydraulic arrangement desired. The abutment plate 27 may be omitted, if desired, by a rearrangement of valve ports and passages. One such rearrangement now will be described.

Figures 10, 11, 12, 13, 14:
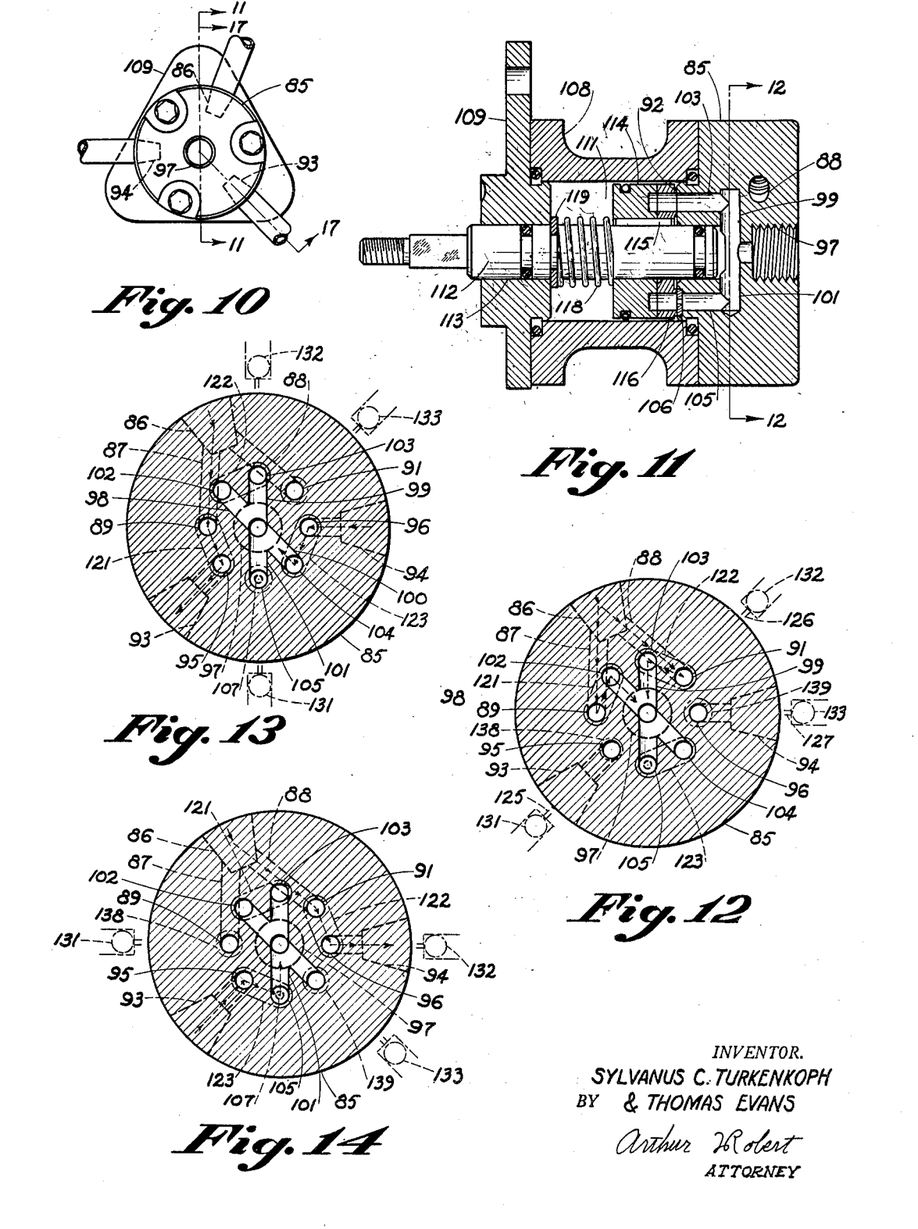
Figure 10 is an end view of a modification.
Figure 11 is a section taken on line 11—11 of Figure 10 on an enlarged scale.
Figure 12 is a section taken on line 12—12 of Figure 11 with movable valve parts diagrammatically shown in dot-and-dash in neutral position.
Figure 13 is a view similar to Figure 12, showing the valve in forward position.
Figure 14 is a view similar to Figure 12, showing the valve in reverse position.
Figure 15:
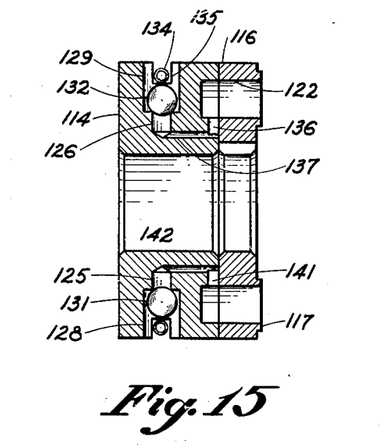
Figure 15 is a section of the valve member taken on line 15—15 of Figure 16.
Figure 16:
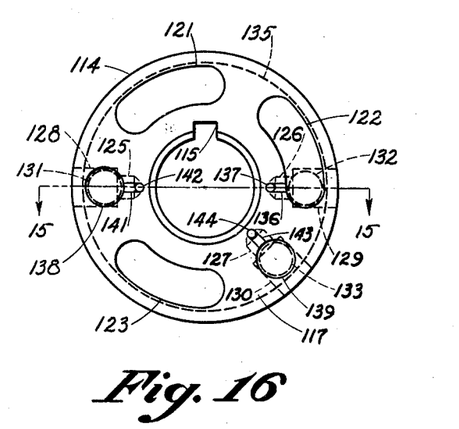
Figure 16 is an end view of the valve member as seen from its seating face, the seating ring being removed.
Figure 17:
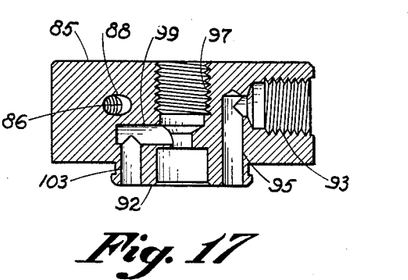
Figure 17 is a section taken on line 17—17 of Figure 10 through the valve body.

Referring to Figures 10 to 17, the cylindrical valve body 85 has a fluid supply tap 86 connected by sloping internal passageways 87 and 88 (Figures 12 to 14) to axially extending ports 89 and 91 which open at the seating face 92 of the body (Figures 11 and 17). Pipe taps 93 and 94 in the body each connect from one side of the motor 47 (Figure 9) to ports 95 and 96 opening into the seating face. In order to render the explanation of the operation of the valve more simple, tap 93 will be considered as the forward connection to the motor and tap 94 as the reverse connection. In the construction illustrated, the centers of taps 86, 93 and 94 are in one plane toward the rear or right of the body, as seen in Figure 17, and the ports 89, 91, 95, and 96 are drilled in deep enough to connect with the radial bores extending from these taps. The threaded exhaust or bypass bore 97 extending coaxially of the body connects with the crossing bores 98, 99, 100, and 101 which respectively connect with axial ports 102, 103, 104, and 105 opening into the seating face 92. Port 105 receives a bushing 106 with a pressed fit that has a small opening 107 therein, so that flow through this port is restricted. If desired, a similar restricting bushing can be positioned also in port 104. Bores 98 to 101 are all in a common plane to the left of taps 86, 93, and 94 (Figure 11), and the respective ports 102 to 105 are drilled the proper depth to connect therewith without intersecting the taps.

A cylindrical housing 108 has one end closed by body 85 and the other end is covered by triangular plate 109 in liquid-tight relation, thus providing a valve seating pressure chamber 111. A valve operating stem 112 passes through bore 113 in the triangular top plate through a packing, and a movable valve disc or plate 114 is connected to be operated by the stem through a key-and-slot connection 115. The valve disc has a hardened ring 116 providing a seating surface 117 engaging the seating surface 92 of the body, but as this ring 116 may be integral with the valve disc its face 117 will be so considered as part of the disc 114 to simplify the description. A spring 118 abutting the valve disc and a thrust washer 119 holds the valve disc on its seat. An adequate clearance is provided between the housing 108 and the periphery of the valve.

Referring to Figure 16, there are three arcuate pockets 121, 122, and 123 formed in the seating face 117 of the disc. Referring to Figure 12, the fluid lines to and from the servo-motor connect by taps 93 and 94 to ports 95 and 96 respectively. In neutral or motor bypass position of the valve disc, pockets 121 and 122 connect supply ports 89, 91 with ports 102 and 103 connecting by radial passages 98 and 99 with central bypass tap 97. In this position liquid supplied to the valve at tap 86 merely bypasses the motor, and in flowing through the valve divided into two streams, one stream flowing through passage 87, bore 89, pocket 121, bore 102 and passage 98 to return passage 97; and the other stream flowing through passage 88, bore 91, pocket 122, bore 103 and passage 99 to return passage 97, which returns to the pump. The pocket 123 connects ports 104 and 105, but as these ports are connected to the bypass bore 97 by radial bores 100 and 101 respectively, the pocket 123 serves no function in this position.

When the valve disc 114 is turned counter-clockwise to the position shown in Figure 13, the pocket 121 connects supply port 89 with port 95 connected to forward tap 93 to the motor. The exhaust from the motor enters by tap 94, and as pocket 123 connects port 96 with port 104 connected to exhaust bore 100, a return path for the motor exhaust is provided. In this position pocket 122 connects exhaust ports 102 and 103 and has no function.

Similarly, when the valve disc is turned clockwise to the position shown in Figure 14, pocket 121 idles across ports 102, 103, and pocket 122 connects supply port 91 to motor reverse port 96. The exhaust from the motor enters at tap 93, and pocket 123 connects port 95 to restricted port 105, which connects by orifice 107 to the exhaust passage 97. Orifice 107 thus restricts the flow of exhaust fluid from the motor, in reverse position, but does not function as a restriction in forward position.

Referring to Figure 14, it will be seen that the exhaust from the motor flows from tap 93 and port 95 through pocket 123, then through restriction 107 in port 105 to the exhaust passages 101 and 97. This restriction 107 throttles the exhaust flow from the motor so that where a negative load develops on the motor it is not possible for the supply pressure at the valve face pocket 122 to fall so low as to develop an unseating force on the valve.

The periphery of valve disc 114 has three radial bores 125, 126, and 127 (Figure 16) which are counterbored at 128, 129, and 130 to provide seats for the ball valves 131, 132 and 133. A garter spring 134 is received in a circumferential groove 135 around the valve to hold the balls on their seats. Pocket 122 has a radial groove 136 connecting with an axial bore 137 that extends to bore 126. The valve face has a circular bore or pocket 138 located between pockets 121, 123, and a similar circular pocket 139 is located between pockets 122, 123. A radial groove 141 extending from pocket 138 joins an axial bore 142 that connects with bore 125, and a radial groove 143 extending from pocket 139 joins an axial bore 144 that connects with bore 127. Ball valves 131 to 133 allow flow of fluid radially outward toward the periphery of the valve disc, and through the clearance at the disc periphery into chamber 111, but do not allow escape of fluid from chamber 111.

Referring to Figures 12 and 16, when the valve is in neutral position ball valve 132 connects by passages 126, 137, and 136 to pocket 122 which is connected by port 91 and passage 88 to supply tap 86. In this position supply pressure can escape past ball 132 into chamber 111 to hold the valve disc 114 on its seat. Ball valve 133 connects by passages 127, 144, 143 and pocket 139 with port 96, and ball valve 131 connects by passages 125, 142, 141 and pocket 138 with port 95. Thus the highest pressure, whether it be the supply pressure at tap 86, or the back pressure of the motor at taps 93, 94, will be applied through the respective ball valves to the chamber 111 to maintain the valve disc on its seat.

In the forward position shown in Figure 13, ball valve 133 is connected by pocket 139 to port 91 which is in turn connected to supply tap 86; ball valve 132 is connected by pocket 122 with the exhaust pressure side of the motor by its connection to port 103, passages 99, 100, pocket 123 and bore 96. Therefore, in this position also the chamber 111 is subjected to the higher pressure, whether that be the motor supply pressure or the exhaust pressure. In the forward position shown in Figure 14, ball valve 131 is connected by pocket 138 to the supply port 89, and ball valve 132 is connected to the supply pressure through the motor supply port 96. Ball valve 133 is connected to the motor exhaust through pocket 139 and port 104 so that again the chamber 111 is subject to the higher pressure, whether that be the motor supply or exhaust pressure.

This construction is of special utility where the motor is subject to fluctuations in force, as for example, where the motor is used to raise or lower a plow or other earth-working tool on a tractor. In such example, when the tool is in raised position and the tractor jostles over rough ground, the tool will be jolted, thus applying a momentary high force on the motor in either direction. With this arrangement the highest pressure is transmitted to chamber 111 to keep the valve disc seated, and thus leakage at the seat is prevented. This prevents creep of the motor.

We claim as our invention:

1. A control valve for a fluid motor, comprising relatively movable members, having cooperating sealing surfaces and having ports in said surfaces arranged to provide forward and reverse fluid passages and a bypass for fluid, one of said members having a pair of back pressure passages, means forming a chamber exerting pressure on one of said members, the said back pressure passages communicating with the chamber, one-way valves in the back pressure passages allowing fluid flow into said chamber and being in communication with the forward and reverse ports when the valve is in fluid bypassing condition to transmit forward and reverse differential pressures across said members to said chamber to hold said members in engagement.

2. In a control system for a reversible fluid motor, the combination comprising, a control valve including relatively movable members having cooperating sealing surfaces and having ports in said surfaces, means forming a chamber communicating with the ports and exerting pressure on one of said members, said ports being operatively arranged to provide reverse and forward fluid passages and a bypass for fluid around a fluid motor, one of said members having a pair of back pressure passages connected to said motor when the control valve is in bypassing condition to apply the back pressure of the motor to said chamber for pressing the working surfaces of said members together, and one-way valve means in the back pressure passages to allow flow of pressure fluid from the motor into said chamber.

3. A control valve for a fluid motor, comprising a cylindrical housing including a head having a pair of supply ports, adapted to be connected to a fluid motor, and an intermediate bypass port, the said head having also a pair of exhaust ports interconnected with said bypass port, a rotatable valve barrel having an axially extending passage adapted to be selectively connected with said bypass port and supply ports, said valve barrel having recesses for selectively connecting one supply port to an exhaust port when said axial passage communicates with the other supply port, means forming a chamber at one end of the barrel, and the valve barrel having back pressure ports located to supply back pressure from said supply ports to the chamber, said back pressure ports having one-way valve means therein allowing flow into said chamber whereby the pressure in said chamber holds the valve barrel seated on said head.

4. A control valve for a fluid motor, comprising a cylindrical housing including a head having a pair of supply ports, adapted to be connected to a fluid motor, and an intermediate bypass port, the said head having also a pair of exhaust ports interconnected with said bypass port, a rotatable valve barrel having an axially extending passage adapted to be selectively connected with said bypass port and supply ports, said valve barrel having recesses for selectively connecting one supply port to an exhaust port when said axial passage communicates with the other supply port, means forming a chamber at one end of the barrel, the valve barrel having back pressure ports located to supply back pressure from said supply ports to the chamber, said back pressure ports having one-way valve means therein allowing flow into said chamber whereby the pressure in said chamber holds the valve barrel seated on said head, a backing plate for the valve barrel, spring means engaging the plate to urge said barrel against said head, and the plate having passages registering with the back pressure ports in the fluid bypassing condition of the valve.

5. A control valve for a fluid motor, comprising a cylindrical housing having a pair of heads, one of said heads having supply ports adapted to be connected to a fluid motor and a bypass port adapted to be connected back to a pressure source, said head also having exhaust ports interconnected with said bypass port, a rototable valve barrel between said heads and having recessed faces, a thrust ring between said valve barrel and the other of said heads and providing a pressure chamber with said head, resilient means in said chamber for maintaining the contacting surfaces of said ring, barrel and ported head in engagement, said valve barrel having an axial supply passage for selective connection with said supply ports and bypass port, the barrel also having recesses for selectively connecting an exhaust port with a supply port and having back pressure ports for registering with said supply ports, said back pressure ports having one-way valve means therein allowing flow into said pressure chamber, and said thrust ring having passages therethrough registering with said back pressure ports.

6. A control valve for a fluid motor, comprising a cylindrical housing having a pair of heads, one of said heads having supply ports adapted to be connected to a fluid motor and a bypass port adapted to be connected back to a pressure source, said head also having exhaust ports interconnected with said bypass port, a rotatable valve barrel between said heads and having recessed faces, a thrust ring between said valve barrel and the other of said heads and providing a pressure chamber with said head, resilient means in said chamber for maintaining the contacting surfaces of said ring, barrel and ported head in engagement, said valve barrel having an axial supply passage for selective connection with said supply ports and bypass port, the barrel having recesses for selectively connecting an exhaust port with a supply port and having back pressure ports for registering with said supply ports, said back pressure ports having one-way valve means therein allowing flow into said pressure chamber, said thrust ring having passages therethrough registering with said back pressure ports, and the barrel having passages connecting the pressure chamber with the recesses in the barrel faces to balance the pressure thrust on the barrel.

7. A control valve for a fluid motor, comprising a cylindrical housing having a ported head and a blank head, said ported head having supply ports adapted to be connected to a fluid motor and a bypass port adapted to be connected back to a pressure source and exhaust ports interconnected with said bypass port, a rotatable valve barrel in said housing spaced from the blank head to provide a pressure chamber therebetween, means resiliently pressing a face of said barrel against said ported head, said barrel having a pair of recesses for interconnecting said supply ports and exhaust ports and a pair of back pressure ports for connecting said pressure chamber with supply ports, and the said back pressure ports having one-way valves therein allowing fluid flow into the chamber.

8. A control system for a fluid motor, comprising a valve including relatively movable members with cooperating sealing surfaces and having ports in said surfaces arranged to provide a supply passage and forward and reverse fluid passages to the motor chamber and a bypass for fluid, said valve having a pressure chamber located to exert pressure on one of said members to maintain said sealing surfaces in engagement, said pressure chamber being in communication with said supply passage when the supply passage is in position to communicate with the respective forward and reverse fluid passages to the motor, a one-way valve in each forward and reverse passage between the supply passage and the motor chamber, means forming a restricted bypass passage around each said one-way valve, and the one-way valve allowing fluid flow through the forward and reverse passages to the motor chamber compelling discharge of fluid from the motor chamber through the restricted bypass.

9. A control system for a fluid motor, comprising a valve including relatively movable members with engaged cooperating sealing surfaces and having ports in said surfaces arranged to provide a supply passage and forward and reverse fluid passages to the motor chamber and a bypass for fluid, means forming a pressure chamber located to exert fluid pressure on one of said members, one of said members having a pair of back pressure passages communicating with the pressure chamber to maintain said sealing surfaces in engagement, a one-way valve in each back pressure passage allowing fluid flow into said pressure chamber from the motor when the respective back pressure passages are in communication with said forward and reverse fluid passages, said pressure chamber being in communication with said supply passage when the supply passage is in position to communicate with the respective forward and reverse fluid passages to the motor, a one-way valve in each forward and reverse passage between the supply passage and the motor chamber and means forming a restricted bypass passage around each latter one-way valve, said one-way valve in each forward and reverse passage allowing fluid flow through the forward and reverse passages to the motor chamber and compelling discharge of fluid from the motor chamber through the restricted bypass.

10. A control valve for a fluid motor, comprising relatively movable members with cooperating sealing surfaces and having ports in said surfaces arranged to provide a supply passage and forward and reverse and exhaust fluid passages, said valve having a pressure chamber located to exert fluid pressure on one of said members to maintain said sealing surfaces in engagement, said pressure chamber being in communication with said supply passage when the supply passage is in position to communicate with the respective forward and reverse fluid passages to the motor, one of said passages having a restriction therein, and one of said members having a passage therein selectively connecting and bypassing said restriction with the exhaust passage.

11. A control valve for a fluid motor, comprising relatively movable members with cooperating sealing surfaces and having ports in said surfaces providing supply and forward and reverse fluid passages, said valve having a pressure chamber located to exert fluid pressure on one of said members to maintain said sealing surfaces in engagement, the said valve members having pressure passages communicating said pressure chamber with the forward, reverse, and supply fluid passages, and a one-way valve in each pressure passage to allow flow of fluid into said pressure chamber.

12. A control valve for a fluid motor, comprising relatively movable members with cooperating sealing surfaces and having ports in said surfaces providing supply and exhaust fluid passages, said valve having a pressure chamber located to exert fluid pressure on one of said members to maintain said sealing surfaces in engagement, a one-way valve connecting the said pressure chamber with said supply passage, means forming a restriction in one exhaust passage, the said valve members providing a fluid flow passage bypassing the restriction when supplying fluid to one exhaust passage, and connecting said restriction into an exhaust passage when supplying fluid to another exhaust passage.

13. A control valve for a fluid motor, comprising relatively movable members with cooperating sealing surfaces and having ports in said surfaces providing forward and reverse passages and a return passage for fluid, means forming a fluid pressure chamber located to exert fluid pressure on one of the valve members to hold said sealing surfaces in engagement, and means forming a plurality of back pressure ducts connecting with at least two of said fluid passages and having one-way valves therein to allow flow into said pressure chamber.

14. A control valve for a fluid motor, comprising relatively movable members with cooperating sealing surfaces and having ports in said surfaces providing supply and exhaust passages, means forming a fluid pressure chamber located to exert fluid pressure on one of the valve members to hold said sealing surfaces in engagement, means forming a pair of back pressure ducts connecting with said fluid passages and having one-way valves therein to allow flow into said pressure chamber, at least one of said passages having a restriction therein, and at least one of the passages in one of the movable members consecting said restriction with an exhaust passage or selectively bypassing the restriction.

15. A control valve for a fluid motor, comprising relatively movable members with cooperating sealing surfaces and having ports in said surfaces providing forward and reverse passages and a bypass passage for fluid, the valve having a fluid pressure chamber located to exert fluid pressure on one of the valve members to hold said sealing surfaces in engagement, the valve having a plurality of back pressure ducts connecting said fluid passages and having one-way valves therein to allow flow into said pressure chamber, means forming a restriction in at least one of the forward and reverse passages, and one of said members having a passage bypassing the restriction.

16. A control valve for a fluid motor, comprising a ported valve plate, a movable valve member having a surface in sealing engagement with said plate and having distributing passages for forward, reverse and bypass passage of fluid, means forming a pressure chamber surrounding said movable valve member, and the movable valve member having a plurality of ducts and having one-way valves in the ducts allowing flow into said chamber, said ducts being connected to the forward, reverse and bypass passages, respectively.

17. A control valve for a fluid motor comprising a housing having a pressure chamber and a ported valve face, a movable valve member in said chamber having a face in sealing engagement with the first face and having ports therein, the valve member having a plurality of radial passages and said passages having one-way valves therein connecting said ports with the pressure chamber, and means biasing said one-way valves to closed position.

18. A control valve for a fluid motor, comprising relatively movable members with cooperating sealing surfaces and having ports in said surfaces providing a supply passage and an alternative supply or exhaust passage for fluid, the valve having a fluid pressure chamber located to exert fluid pressure on one of the valve members to hold said sealing surfaces in engagement, and the valve having a pair of back pressure ducts connecting with said supply and alternative passages, each duct having a one-way valve therein to allow flow into said pressure chamber.

SYLVANUS C. TURKENKOPH.
THOMAS EVANS.

REFERENCES CITED

The following references are of record in the file of this patent:

UNITED STATES PATENTS

| Number | Name | Date |
|---|---|---|
| 870,104 | Holden | Nov. 5, 1907 |
| 905,605 | Tarn | Dec. 1, 1908 |

FOREIGN PATENTS

| Number | Country | Date |
|---|---|---|
| 14,666 | Great Britain | of 1897 |